Nov. 6, 1956 P. J. ALGIERS ET AL 2,769,574
AUTOMATIC FLUID FLOW CONTROL DEVICE
Filed Aug. 26, 1955. 2 Sheets-Sheet 1
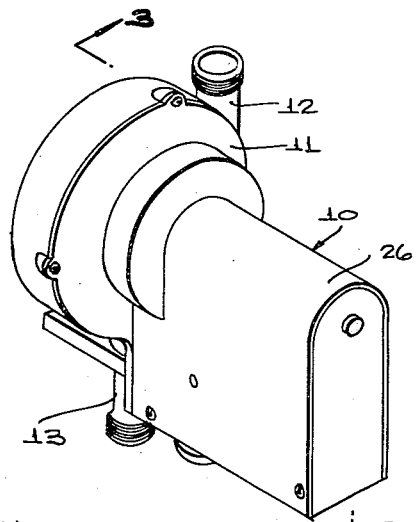
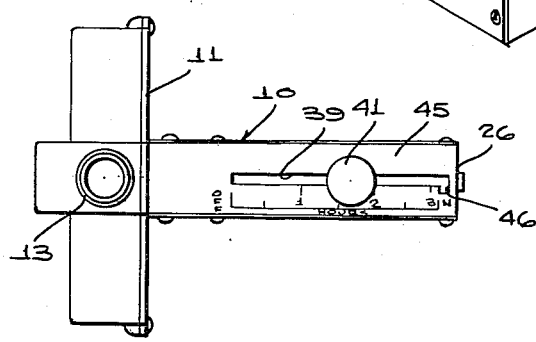
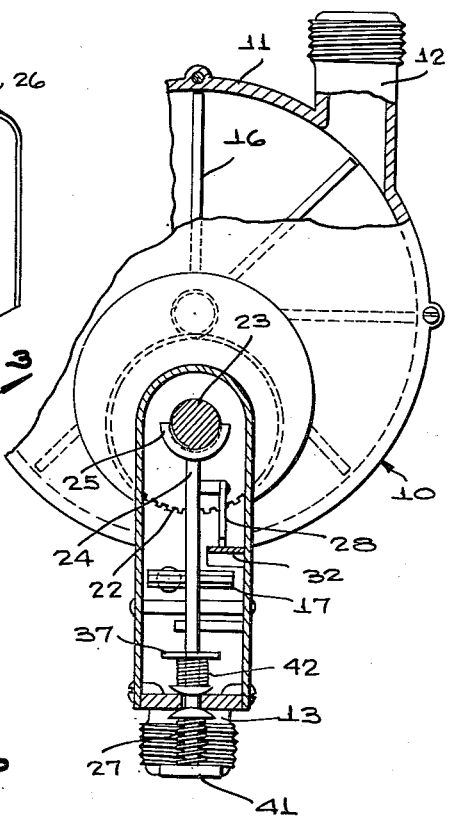
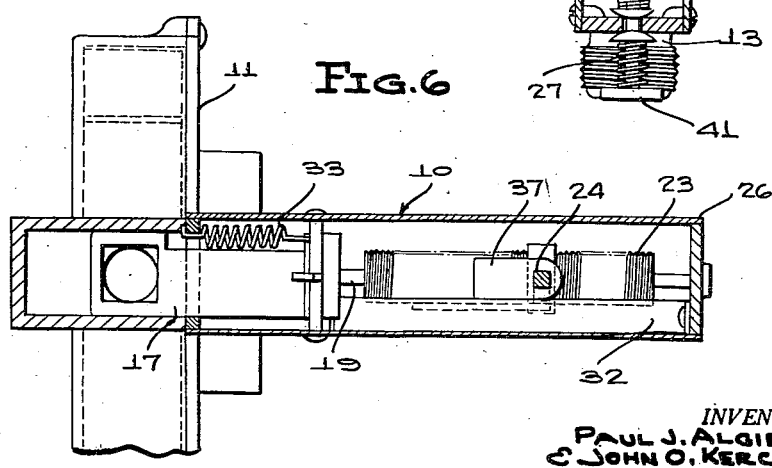
INVENTORS
PAUL J. ALGIERS
& JOHN O. KERCHEVAL
BY
McMorrow, Berman & Davidson
ATTORNEYS Nov. 6, 1956  P. J. ALGIERS ET AL  2,769,574
AUTOMATIC FLUID FLOW CONTROL DEVICE
Filed Aug. 26, 1955  2 Sheets-Sheet 2
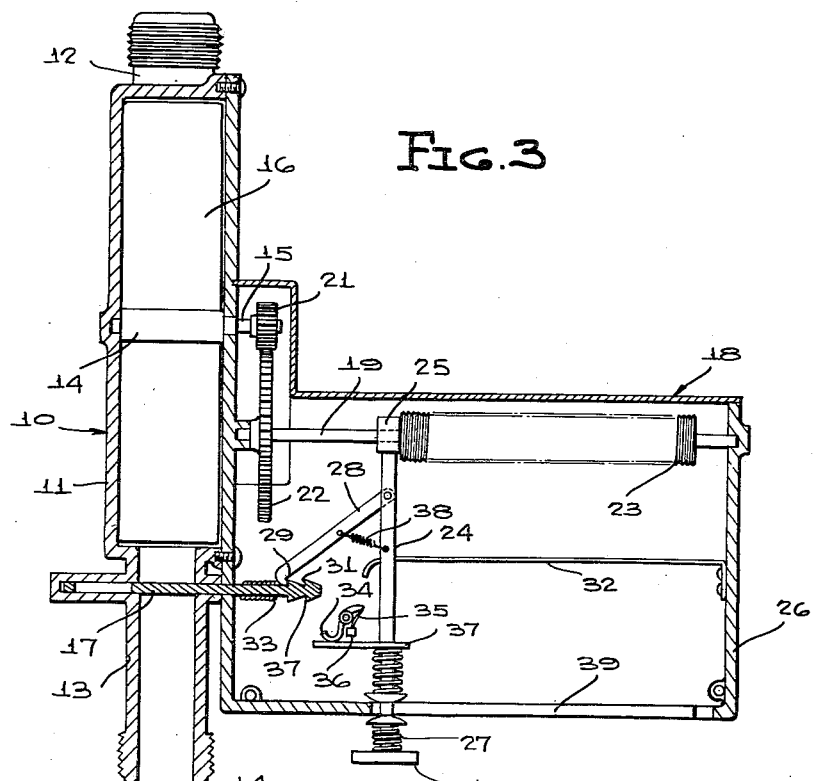
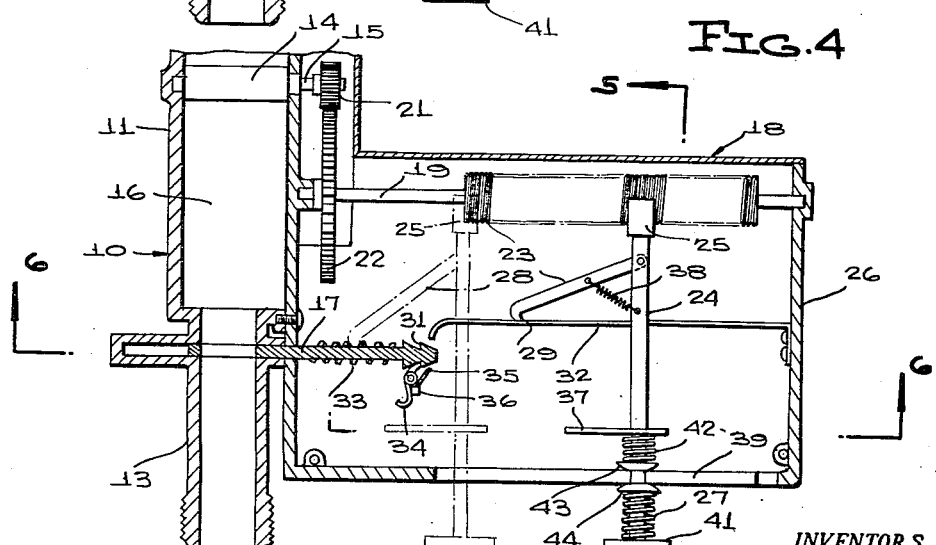
INVENTORS
PAUL J. ALGIERS
BY & JOHN O. KERCHEVAL
McMorrow, Berman + Davidson
ATTORNEYS.

United States Patent Office 2,769,574
Patented Nov. 6, 1956

2,769,574
AUTOMATIC FLUID FLOW CONTROL DEVICE

Paul J. Algiers, Stoneham, and John O. Kercheval, Woburn, Mass.

Application August 26, 1955, Serial No. 530,751

4 Claims. (Cl. 222—59)

The present invention relates to a device for automatically controlling the flow of a fluid.

An object of the present invention is to provide a device which automatically shuts off the flow of a gas or liquid after a predetermined quantity of the gas or liquid has been delivered.

Another object of the present invention is to provide a device which automatically cuts off the flow of a gas or liquid after a predetermined period of time when the rate of fluid flow is known and constant.

A further object of the present invention is to provide a device for shutting off the flow of a gas or liquid which is simple in structure, one sturdy in construction, economical to manufacture and assemble, and one highly effective in action.

These and other objects and advantages of the present invention will be fully apparent from the following description when taken in connection with the annexed drawings, in which:

Figure 1 is an isometric view of the device of the present invention,

Figure 2 is a bottom plan view of the assembly of Figure 1,

Figure 3 is a sectional view, on an enlarged scale, taken on the line 3—3 of Figure 1, showing the valve in closed position, Figure 4 is a sectional view similar to Figure 3 with a portion broken away and showing the valve in open position, Figure 5 is a sectional view taken on the line 5—5 of Figure 4, and Figure 6 is a sectional view taken on the line 6—6 of Figure 4.

Referring in greater detail to the drawing, in which like numerals indicate like parts throughout the several views, the automatic fluid flow control device of the present invention is indicated generally by the reference numeral 10 and comprises a cylindrical housing 11 having an outlet pipe 12 and an inlet pipe 13 disposed oppositely of the housing and projecting from the periphery thereof. A horizontally-disposed drive shaft 14 is rotatably supported in the housing 11 and has one end 15 projecting from the housing 11. A paddle wheel 16 is positioned within the housing and is carried on the drive shaft 14 for rotation therewith in response to the flow of fluid admitted through the inlet pipe 13. A gate valve 17 is arranged transversely of and closes the inlet pipe 13 and is connected to the inlet pipe 13 intermediate the ends of the latter for movement from the closing position, as shown in Figure 3, to a position in which the inlet pipe 13 is open, as shown in Figure 4.

A time settable control-operating device indicated generally by the reference numeral 18 is operatively connected to the projecting end of the drive shaft 14 and to the gate valve 17 and includes a driven shaft 19 positioned adjacent the drive shaft 14 and connected to the latter for movement therewith, the drive shaft 14 having on its projecting end 15 a spur gear 21 in mesh with the spur gear 22 upon the adjacent end of the driven shaft 19. An externally threaded spool 23 is carried by the driven shaft 19 and constitutes a control-operating element. An actuating member 24 having an internally-threaded saddle 25 constituting a time-setting element projecting from one end is positioned so that the saddle 25 is normally adjacent to and out of engagement with the spool 23, as shown in Figure 3, and is supported in a casing 26 secured to one side of the housing 11 for sliding movement from the position in which the saddle is out of engagement with the spool 23 (Figure 3) to any selected position of driving engagement with the spool 23. One selected position of driving engagement with the spool 23 is shown with the actuating member 23 in full lines in Figure 4 and another position of driving engagement with the spool 23 is shown in dotted lines in Figure 4 in which position the actuating member 24 is approaching the end of the spool 23 and is about to move to the position shown in solid lines in Figure 3, a spring 27 on the other end of the actuating member 24 opposite to the saddle 25 being arranged so as to bias the actuating member 24 so that the saddle 25 is in engagement with its threads meshing with the threads on the spool 23 and also biasing the actuating member 24 to the position in which it embracingly engages the drive shaft 19 after it has slipped off of the end of the spool 23.

A latching element 28 is pivotally carried by the actuating member 24 and has a hook 29 on its free end engageable with teeth 31 on the adjacent end of the gate valve 17 when the gate valve 17 is in its closing position. The hook 29 on the latching element 28 engages one of the teeth 31 on the gate valve 17 to move the latter to open position upon initiation of movement of the actuating member 24 from the position in which the saddle 25 is shifted from its position out of engagement with the spool and in engagement with the portion of the driven shaft 19 contiguous to the end of the spool 23 adjacent the connected end of the driven shaft 19 to any selected position of driving engagement of the saddle 25 with the spool 23, there being a bracket 32 projecting from the end of the casing 26 remote from the housing 11 longitudinally of the casing 26 and parallel to the spool 23 for releasing the latching element 28 from its engagement with the gate valve 17 after the gate valve 17 has been moved to its open position. A spring 33, as shown most clearly in Figure 6, operatively connects the gate valve 17 for biasing the latter towards its closed position.

A releasable holding means embodying a swingably supported catch 34 is arranged in the path of movement of the gate valve 17 and is engageable with the gate valve when the valve has been moved to its open position and is operable to hold the valve in the open position. The catch 34 is held in its position of engagement with the gate valve 17 by means of a leaf spring 35 projecting upwardly from a stop 36, the stop providing a means for preventing the movement of the catch 34 beyond its holding position.

An arm 37 carried upon the actuating member 24 intermediate the ends of the latter is engageable with the catch 34 to release the latter, upon transverse movement of the actuating member 24 when the saddle 25 has reached the one end of the spool 23 and slips out of engagement with the spool 23 to its position embracingly engaging the portion of the driven shaft 19 contiguous to the end of the spool 23 adjacent the spur gear 22. When released, the gate valve 17 moves from its open position shown in Figure 4 to its closed position shown in Figure 3 under the action of the spring 33. A coil spring 38 biases the latching element 28 into its position in which a hook 29 will engage one of the teeth 31 upon the end of the gate valve 17.

The one end of the actuating member 24 projects through a slot 39 in the casing 26 and is provided with a handle 41 for manually moving the actuating member 24 to one of any selected positions in which the threads on the saddle 25 are in mesh with the threads on the spool 23.

The actuating member 24 carries another spring 42 which biases a rounded disk 43 into engagement with the sides of the slot 39, the spring 27 biasing a similarly shaped disk 44 into the other side of the slot 39 to prevent the lateral or wobbling movement of the actuating member 24.

As shown most clearly in Figure 2, the under face of the housing 26 is provided with an indicator face 45 graduated to indicate periods of time for the selective positioning of the saddle 25 upon the spool 23 and indicating that the length of time that it takes the saddle 25 to traverse the spool 23 to its position where it will drop off of the one end of the spool 23 to the position embracingly engaging the portion of the shaft 19 contiguous to that one end of the spool 23. A notch 46 extends traversely to the slot 39 and forms a means by which the actuating arm 24 may be kept out of engagement with the spool 23, and the saddle 25, when the actuating arm 24 is in the notch 46, lying to the end of the spool 23 out of engagement therewith and remotely from the valve 17.

In use, the threaded ends of the inlet and outlet may be connected in a conduit assembly such as is used in a sprinkler and hose assembly and the actuating arm may be moved to a position in which the saddle 25 engages the spool 23 and upon turning of the water wheel 16 the actuating arm will move slowly towards the position in which the arm 37 will release the catch 34 when the saddle 25 slips off of the one end of the spool 23. The fluid flow control device of the present invention may be used to control the flow of gases or other fluids and liquids in addition to water as desired.

What is claimed is:

1. An automatic fluid flow control device comprising a cylindrical housing having oppositely-disposed outlet and inlet pipes projecting from the periphery thereof, a horizontally-disposed drive shaft rotatably supported in said housing and having one end projecting therefrom, a paddle wheel positioned within said housing and carried by said shaft for rotation therewith in response to the flow of fluid admitted through said inlet pipe, a gate valve arranged transversely of and closing said inlet pipe intermediate the ends thereof and connected to said inlet pipe for movement from the closing position to a position in which said inlet pipe is open, and a time-settable control-operating device operatively connected to the projecting end of said drive shaft and to said gate valve, said device including a driven shaft positioned adjacent said drive shaft and connected to the latter for movement therewith, a control-operating element carried by said driven shaft, an actuating member having a time-setting element positioned so that the time-setting element is normally adjacent to and out of engagement with said control-operating element and movable from the position in which the time-setting element is out of engagement with said control-operating element to any selected position of driving engagement with said control-operating element, and a latching element pivotally carried by said actuating member and engageable with means on said gate valve when the latter is in its closing position and releasable from said means upon initiation of the movement of said actuating member from the position in which the time-setting element is shifted from its position of out of engagement with said control-operating element to any selective position of driving engagement with said control-operating element and move said gate valve to its position in which the inlet pipe is open.

2. An automatic fluid flow control device comprising a cylindrical housing having oppositely-disposed outlet and inlet pipes projecting from the periphery thereof, a horizontally-disposed drive shaft rotatably supported in said housing and having one end projecting therefrom, a paddle wheel positioned within said housing and carried by said shaft for rotation therewith in response to the flow of fluid admitted through said inlet pipe, a gate valve arranged transversely of and closing said inlet pipe intermediate the ends thereof and connected to said inlet pipe for movement from the closing position to a position in which said inlet pipe is open, and a time-settable control-operating device operatively connected to the projecting end of said drive shaft and to said gate valve, said device including a driven shaft positioned adjacent said drive shaft and connected to the latter for movement therewith, a control-operating element carried by said driven shaft, an actuating member having a time-setting element positioned so that the time-setting element is normally adjacent to and out of engagement with said control-operating element and movable from the position in which the time-setting element is out of engagement with said control-operating element to any selected position of driving engagement with said control-operating element, a latching element pivotally carried by said actuating member and engageable with means on said gate valve when the latter is in its closing position and releasable from said means upon initiation of the movement of said actuating member from the position in which the time-setting element is shifted from its position of out of engagement with said control-operating element to any selective position of driving engagement with said control-operating element and move said gate valve to its position in which the inlet pipe is open, and spring means operatively connected to said gate valve for biasing the latter toward its closed position.

3. An automatic fluid flow control device comprising a cylindrical housing having oppositely-disposed outlet and inlet pipes projecting from the periphery thereof, a horizontally-disposed drive shaft rotatably supported in said housing and having one end projecting therefrom, a paddle wheel positioned within said housing and carried by said shaft for rotation therewith in response to the flow of fluid admitted through said inlet pipe, a gate valve arranged transversely of and closing said inlet pipe intermediate the ends thereof and connected to said inlet pipe for movement from the closing position to a position in which said inlet pipe is open, and a time-settable control-operating device operatively connected to the projecting end of said drive shaft and to said gate valve, said device including a driven shaft positioned adjacent said drive shaft and connected to the latter for movement therewith, a control-operating element carried by said driven shaft, an actuating member having a time-setting element positioned so that the time-setting element is normally adjacent to and out of engagement with said control-operating element and movable from the position in which the time-setting element is out of engagement with said control-operating element to any selected position of driving engagement with said control-operating element, a latching element pivotally carried by said actuating member and engageable with means on said gate valve when the latter is in its closing position and releasable from said means upon initiation of the movement of said actuating member from the position in which the time-setting element is shifted from its position of out of engagement with said control-operating element to any selective position of driving engagement with said control-operating element and move said gate valve to its position in which the inlet pipe is open, spring means operatively connected to said gate valve for biasing the latter to its closed position, and a releasable swingably supported holding element arranged in the path of movement of said gate valve and engageable with said valve when the valve has been moved to its open position to hold it in the latter position.

4. An automatic fluid flow control device comprising a cylindrical housing having oppositely-disposed outlet and inlet pipes projecting from the periphery thereof, a horizontally-disposed drive shaft rotatably supported in said housing and having one end projecting therefrom, a paddle wheel positioned within said housing and carried by said shaft for rotation therewith in response to the flow of fluid admitted through said inlet pipe, a gate valve arranged transversely of and closing said inlet pipe intermediate the ends thereof and connected to said inlet pipe for movement from the closing position to a position in which said inlet pipe is open, and a time-settable control-operating device operatively connected to the projecting end of said drive shaft and to said gate valve, said device including a driven shaft positioned adjacent said drive shaft and connected to the latter for movement therewith, a control-operating element carried by said driven shaft, an actuating member having a time-setting element positioned so that the time-setting element is normally adjacent to and out of engagement with said control-operating element and movable from the position in which the time-setting element is out of engagement with said control-operating element to any selected position of driving engagement with said control-operating element, a latching element pivotally carried by said actuating member and engageable with means on said gate valve when the latter is in its closing position and releasable from said means upon initiation of the movement of said actuating member from the position in which the time-setting element is shifted from its position of out of engagement with said control-operating element to any selective position of driving engagement with said control-operating element and move said gate valve to its position in which the inlet pipe is open, spring means operatively connected to said gate valve for biasing the latter to its closed position, a releasable swingably supported holding element arranged in the path of movement of said gate valve and engageable with said valve when the valve has been moved to its open position to hold it in the latter position, and means carried by said actuating member and engageable with said holding element upon movement of said actuating member from the position in which said time-setting element is released from driving engagement with said control-operating element to release said holding element from engagement with said gate valve and permit said gate valve to return to its closing position under the action of said spring means.

No references cited.